United States Patent
Okada

[11] Patent Number: 5,937,527
[45] Date of Patent: Aug. 17, 1999

[54] HOLDING MEANS FOR BLADE OF HANDSAW

[75] Inventor: Tamotsu Okada, Miki, Japan

[73] Assignee: Kabushiki Kaisha Okada Kinzoku, Hyogo, Japan

[21] Appl. No.: 08/935,004

[22] Filed: Sep. 22, 1997

[30] Foreign Application Priority Data

Sep. 30, 1996 [JP] Japan ................................ 8-280080

[51] Int. Cl.[6] .............................. B25G 3/12; B27B 3/00
[52] U.S. Cl. ................................ 30/332; 30/337; 30/344; 30/517
[58] Field of Search ........................ 30/332, 333, 337, 30/339, 340, 342, 344, 517

[56] References Cited

U.S. PATENT DOCUMENTS

| | | | |
|---|---|---|---|
| 298,115 | 5/1884 | Peace | 30/517 |
| 2,361,256 | 10/1944 | Barland | 30/517 |
| 3,509,627 | 5/1970 | Gilbert et al. | 30/332 |
| 3,660,895 | 5/1972 | West | 30/332 |
| 3,703,036 | 11/1972 | Karubian | 30/339 |
| 4,841,638 | 6/1989 | Bardeen et al. | 30/337 |
| 4,870,757 | 10/1989 | Kirkpatrick et al. | 30/344 |
| 5,722,168 | 3/1998 | Huang | 30/339 |

*Primary Examiner*—M. Rachuba
*Assistant Examiner*—Gyounghyun Bae
*Attorney, Agent, or Firm*—Darby & Darby

[57] ABSTRACT

A blade holder attached to a saw handle. The saw blade includes a slot on one side, and is engaged inside the blade holder and is securely held in place by stoppers formed inside the holder's frame and by pressure applied by spring action. This spring action is created via a turning of a knob and attached pressing part and protrusion. When the knob is in a loosened position, the blade is easily removed and replaced through a holder receiving part. A new blade is received through the receiving part and by tightening the knob, the new blade is thereby secured in the holder.

4 Claims, 3 Drawing Sheets

# HOLDING MEANS FOR BLADE OF HANDSAW

BACKGROUND OF THE INVENTION

1. Field of the Invention

The present invention relates to an improvement of a holding means for a blade of a handsaw of a type using spare blades or of a blade-replaceable type.

2. Prior Art

Handsaws for wood-working are so adapted or structured in recent years that a blade when becomes dull can be replaced with a spare one. The handsaws using the spare blades need to have a holding means for supporting or holding the blade. Conventionally, the holding means is generally so structured that the holding means does inside have a retaining part by which a blade is retained at its recessed part, or that a root portion of the blade is inserted horizontally into the holding means and a lower edge of the blade is pressed and fastened by use of a screw mounted on a lower part of the holding means.

Some holding means in the conventional blade-replaceable handsaws are, as their characteristics, given importance on operating efficiency upon replacing the blades; some are so on certainty of the mounted state of the blades in use of the handsaws. The latter is likely to be complicated in structure of the holding means itself, and the former cannot avoid uncertainty of the mounted state of the blades in use of the handsaws.

SUMMARY OF THE INVENTION

An object of the present invention is to overcome the above problems in the conventional blade-holding means for a handsaw.

A holding means for a blade of a handsaw of a blade-replaceable type according to the present invention comprises: a pair of plate members, which face to each other and serve as a mounting part for a blade or a spare blade, either of the plate members being provided on its surface with a receiving part by which a cut formed on a blade is retained; and a tightening member which is arranged on one of the plate members and has a projection, which enters a mounting hole formed on the blade, a pressing surface to contact with an outer surface of the plate member, and a threaded part screwable with a threaded hole formed on the other of the plate members, whereby when the tightening member is operated, with a blade being inserted between the two plate members, the projection enters the mounting hole of the blade and the pressing surface presses the outer surface of the plate member, thereby allowing the blade to be easily and surely mounted.

DETAILED DESCRIPTION OF THE INVENTION

Embodiments

Figure 1:
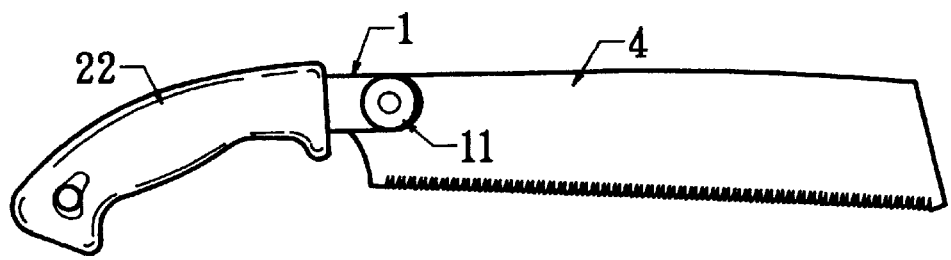
FIG. 1 is a front view showing a handsaw having a holding means according to the present invention mounting a grip and a blade.
Figure 2:
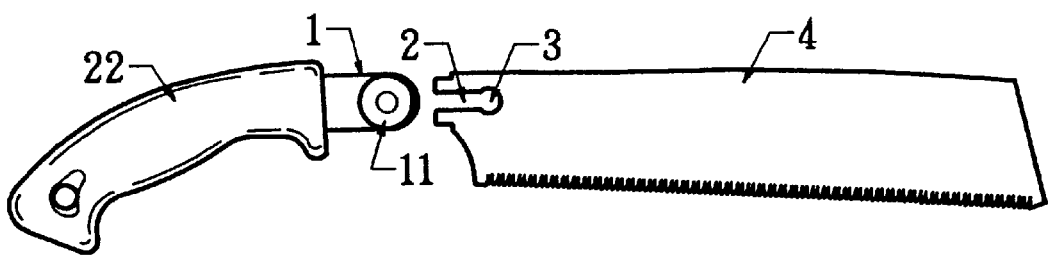
FIG. 2 is a front view showing a structure of a blade and a manner of mounting the blade to the holding means.

Next, the present invention will be further detailed with referring to an example of the invention shown in the drawings. A holding means 1 does, as seen in FIGS. 1 through 7, comprise two plate members 6 and 7 which face to each other. Either of the plate members 6 and 7 has a receiving part 8. Arranged at one plate member 7 is a tightening member 11 having a projection 9, a pressing part 10 to contact with an outer surface of the plate member 7, and a threaded part 12. A root portion of a spare blade 4, which has a cut 2 and a mounting hole 3 at the side of the root portion, is tightened or fixed by turning the tightening means 11.

In more detail, the spare blade 4 to be mounted to the holding means 1 has teeth along a lower edge and also has the cut 2 formed by horizontally cutting a rear end toward a fore or opposite end, and the mounting hole 3 adjoining to the cut 2 and having a diameter larger than the width of the cut 2.

As shown in FIGS. 1 through 7, the holding means 1 uses two plate members 6 and 7, which are semicircular at utmost ends and arranged to face to each other, so that the root portion of the blade 4 can be inserted between the two plate members. One plate member 6 has a shallow recess 5 formed on the surface by press working. The plate member 6 has also a threaded through bore 13 on the recess 5 at a position slightly inward from the utmost end, with which the threaded part 12 of the tightening member 11 described later is screwed.

Figure 3:
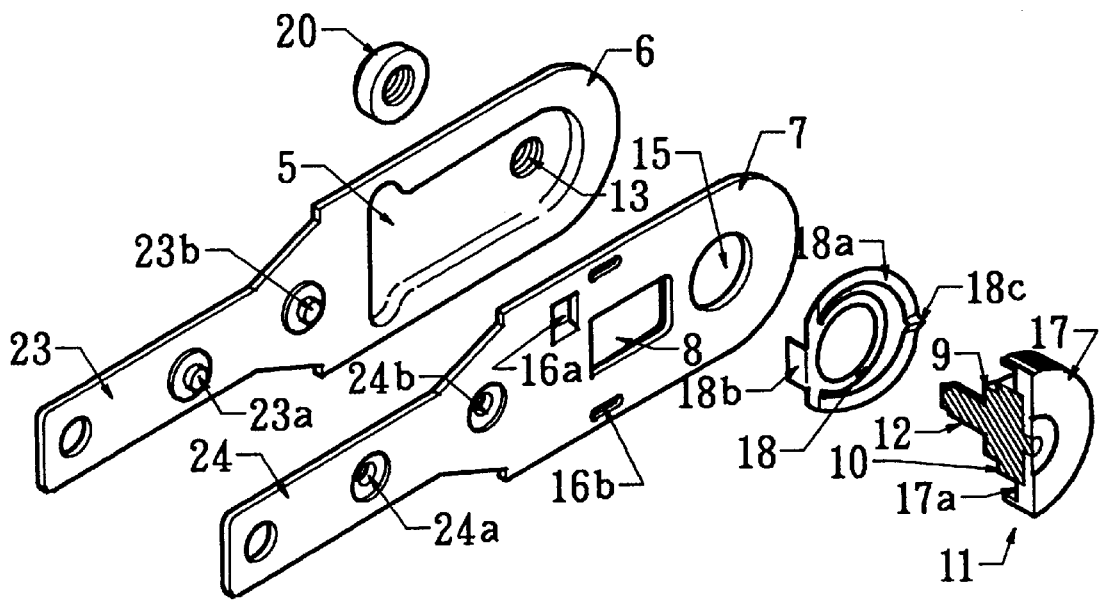
FIG. 3 is an explosive perspective view showing specific components of the holding means.

Another plate member 7 has a bore 15 at a position slightly inward from the utmost end, as seen in FIG. 3, in which the projection 9 of the tightening member 11 is fit. The plate member 7 has the receiving part 8, which is formed at a position nearer the root portion than the bore 15 by press working to project on the inner surface and is fit in the cut 2 of the spare blade 4 when mounted. The plate member 7 does further have stoppers 16a and 16b, which are formed at the rear of or inward from and at the upper and lower sides of the receiving part 8 by press working to project on the inner surface and abut against the rear end of the spare blade 4 when mounted.

Figure 4:
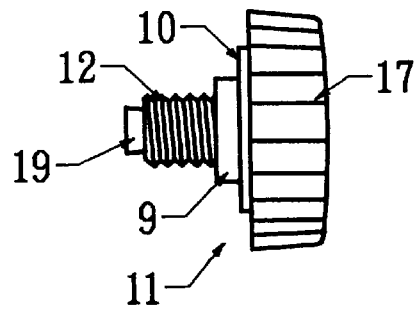
FIG. 4 is a side view showing a structure of a tightening member.
Figure 5:
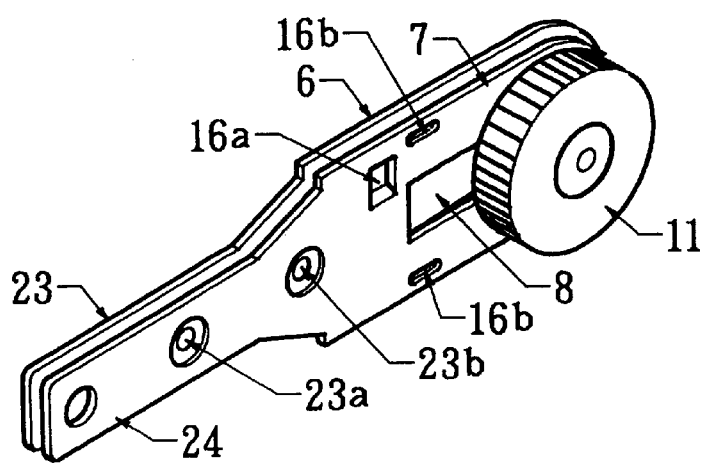
FIG. 5 is a perspective view of the holding means.
Figure 6:
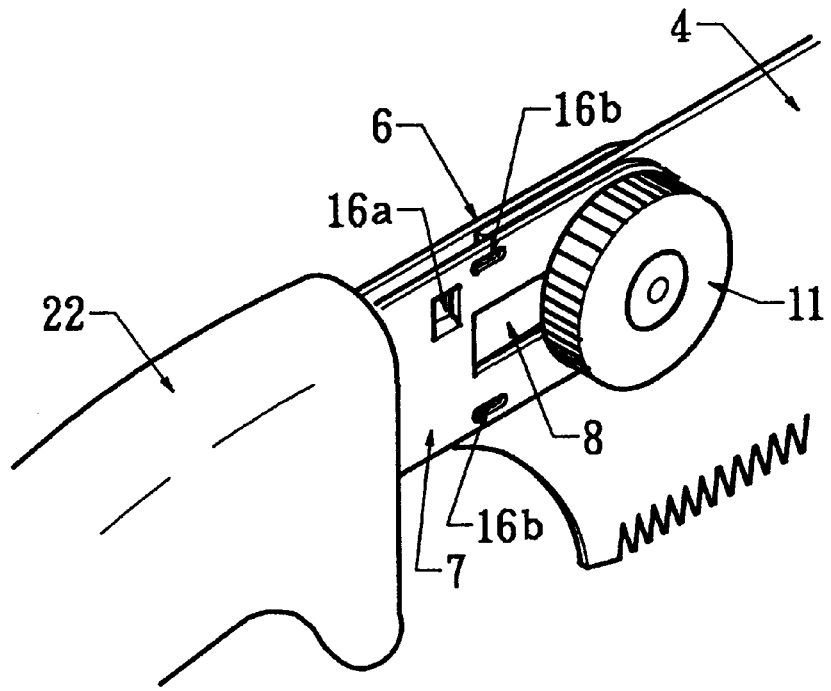
FIG. 6 is an enlarged perspective view showing the holding means in engagement with the blade.
Figure 7:
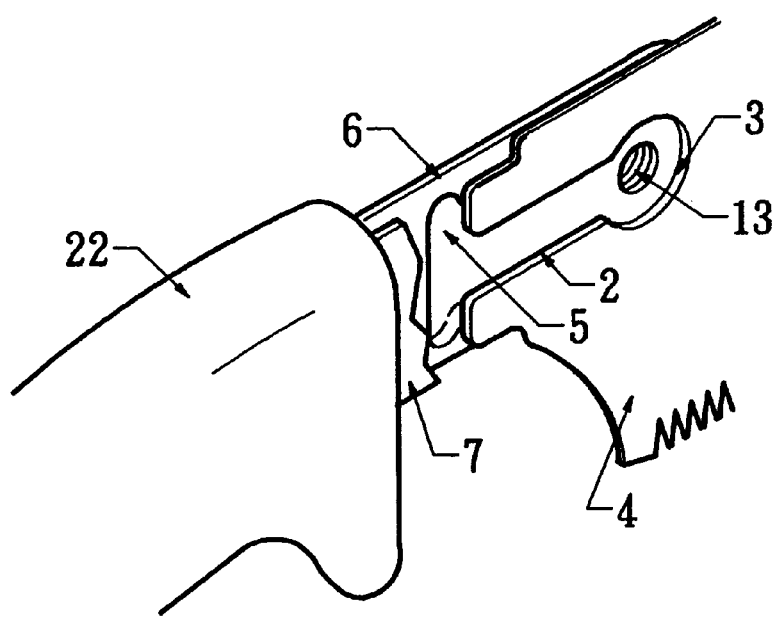
FIG. 7 is a partially broken perspective view showing the holding means in engagement with the blade.

The tightening member 11 does, as shown in FIGS. 3 and 4, comprise a round knob 17 and a metallic part having the threaded part 12 at the utmost end, the projection 9 and the pressing part 10, a root portion of the metallic part being embedded at the center of the knob 17. The tightening member 11 is fit to the plate members 6 and 7 in such manner that a disc 18 having a spring 18a is fit onto the pressing part 10, with a retaining part 18b being engaged with the right-hand side of the receiving part 8 of the plate member 7; a projection 18c of the spring 18a is engaged in a groove 17a formed on the inner surface of the knob 17; and the threaded part 12 is screwed with the threaded bore 13 on the plate member 6. A stepped portion 19 at the utmost end of the threaded part 12 is provided for caulking. After fitting the tightening member 11 to the plate member 6, a ring 20 is screwed with the end of the threaded part 12 and pressed to be deformed, thereby preventing the tightening member 11 from falling off unexpectedly.

The holding means 1 for a blade of a handsaw according to the present invention has the above structure. First, protuberances 23a, 23b formed on a root portion 23 of the plate member 6 are fit into holes 24a, 24b on a root portion 24 of the plate member 7. The holding means 1 is then embedded and fixed at an end of a grip 22 to form a part of the grip or handle of a blade-replaceable handsaw. For mounting a spare blade 4 to the holding means 1, the blade 4 is, first, inserted between the plate members 6 and 7 until the blade 4 is received at its rear end by the receiving part 8, abuts at its root edge against the stopper 16a, and abuts at the upper and lower parts of the root edge against the stoppers 16b. Then, the tightening member 11 is turned to cause the projection 9 to fit into the mounting hole 3 of the blade 4 and cause the blade 4 to be firmly sandwiched between the plate members 6 and 7.

Effect of the Invention

As seen from the above, the holding means 1 for a blade of a handsaw according to the present invention has the above structure and enables spare blades having various thickness or a double-edged blade to be surely mounted to the holding means 1 irrespective of thickness of blades. Thus, the holding means according to the present invention, i.e., a handsaw using the holding means is durable with full safety under various use conditions and has such advantage that it is usable for a long time without a defect of lowering of a blade-sandwiching or holding effect of the holding means due to long use, in comparisonwith the conventional art.

What we claimed is:

1. A holding means for a blade of a handsaw for mounting a spare blade having a root portion for mounting in a front portion of said holding means, said root portion having a cut extending to an inner edge of said blade with a mounting hole therein located inward of the inner edge and having a diameter larger than a width of the cut, the holding means comprising:

first and second opposing plate members, each plate member having an inner and outer surface, a handle for receiving said first and second plate members, one of the plate members being provided on the inner surface with a receiving part for retaining the root portion of the blade, said receiving part comprising all inwardly directed indentation having a corresponding depression on the outer surface of the first plate member for engaging the cut on said blade;

the first plate member having a bore therein;

the second plate member having a threaded bore opposing said bore in the first plate member when said holding means is assembled; and a tightening member arranged at the first plate member, the tightening member having a projection for fitting through the bore in the first plate and said mounting hole in the blade, a pressing part adjacent the outer surface of the first plate member, and a threaded part screwable into the threaded bore in the second plate member, whereby when the holding means is assembled and the blade is inserted between the plate members, the projection enters the mounting hole of the blade and turning the tightening member applies pressure from the pressing part against the outer surface of the first plate member, thereby fixing the blade in place, said tightening member being adjustable to allow for the use of different thickness blades.

2. A holding means as recited in claim 1, further comprising:

a disk having a hole therein and a spring connected to said disk and extending around a portion of the periphery of said disk;

said disk being placed on the projection of the tightening member between the pressing part and the outer surface of the first plate member.

3. A holding means as recited in claim 1, wherein said first plate member includes an inwardly extending stopper positioned rearward of said receiving part and abutting the root portion of the blade when the blade is mounted.

4. A holding means as recited in claim 1, wherein said first plate member includes a first inwardly extending stopper positioned above said receiving part and a second inwardly extending stopper positioned below said receiving part, said first and second stoppers abutting the root portion of the blade when the blade is mounted.

* * * * *